US008257625B2

(12) United States Patent
Waltl et al.

(10) Patent No.: US 8,257,625 B2
(45) Date of Patent: Sep. 4, 2012

(54) MOLDED FILTER

(75) Inventors: Hans Gunter Alexander Waltl, Richmond (GB); John Farby, North Allerton (GB)

(73) Assignee: PSI Global Ltd. (GB)

( * ) Notice: Subject to any disclaimer, the term of this patent is extended or adjusted under 35 U.S.C. 154(b) by 486 days.

(21) Appl. No.: 12/223,217

(22) PCT Filed: Jan. 30, 2007

(86) PCT No.: PCT/GB2007/050043
§ 371 (c)(1),
(2), (4) Date: Mar. 11, 2009

(87) PCT Pub. No.: WO2007/088398
PCT Pub. Date: Aug. 9, 2007

(65) Prior Publication Data
US 2010/0032869 A1 Feb. 11, 2010

(30) Foreign Application Priority Data

Jan. 31, 2006 (GB) .................................. 0601888.1

(51) Int. Cl.
*B28B 21/02* (2006.01)
*B28B 21/06* (2006.01)
*B28B 21/42* (2006.01)
*B29C 39/38* (2006.01)

(52) U.S. Cl. ....................... 264/86; 264/236; 264/331.18
(58) Field of Classification Search ................... 264/86, 264/236, 331.18
See application file for complete search history.

(56) References Cited

U.S. PATENT DOCUMENTS

| 3,142,612 | A | * | 7/1964 | Reiman ........................ 162/145 |
| 3,786,126 | A | | 1/1974 | Reimschussel et al. |
| 4,272,318 | A | * | 6/1981 | Walker et al. ................ 162/382 |
| 4,303,472 | A | | 12/1981 | Walker et al. |
| 4,360,433 | A | * | 11/1982 | Walker et al. ................ 210/484 |
| 4,376,675 | A | * | 3/1983 | Perrotta ........................ 162/145 |
| 5,129,923 | A | | 7/1992 | Hunter et al. |
| 5,318,990 | A | | 6/1994 | Strauss |
| 5,932,689 | A | | 8/1999 | Arkens et al. |
| 5,977,232 | A | | 11/1999 | Arkens et al. |
| 6,071,994 | A | * | 6/2000 | Hummerich et al. ......... 524/247 |
| 6,099,773 | A | | 8/2000 | Reck et al. |
| 6,136,916 | A | | 10/2000 | Arkens et al. |
| 6,146,746 | A | | 11/2000 | Reck et al. |
| 6,221,973 | B1 | | 4/2001 | Arkens et al. |
| 6,274,661 | B1 | | 8/2001 | Chen et al. |
| 6,299,936 | B1 | | 10/2001 | Reck et al. |
| 6,331,350 | B1 | | 12/2001 | Taylor et al. |
| 6,699,945 | B1 | | 3/2004 | Chen et al. |
| 2001/0029843 | A1 | * | 10/2001 | Minoru et al. ................... 96/135 |
| 2002/0148776 | A1 | * | 10/2002 | Cousart et al. ................ 210/504 |
| 2004/0145072 | A1 | | 7/2004 | Hunter |
| 2004/0208993 | A1 | | 10/2004 | Fongalland et al. |
| 2005/0215153 | A1 | | 9/2005 | Cossement et al. |
| 2006/0108280 | A1 | * | 5/2006 | Jodi .............................. 210/505 |
| 2007/0059507 | A1 | * | 3/2007 | Xing et al. .................. 428/292.1 |
| 2011/0115102 | A1 | * | 5/2011 | Dema ............................... 261/5 |

FOREIGN PATENT DOCUMENTS

| EP | 1385598 | 2/2004 |
| WO | WO-2004/089509 A2 | 10/2004 |
| WO | WO-2005/120678 A1 | 12/2005 |

OTHER PUBLICATIONS

International Application No. PCT/GB2007/050043, International Search Report mailed May 7, 2007, 3 pgs.
Jodi, W., et al., "Water-Based Polymer Binders for Coalescing Filters", *Advances in Filtration and Separation Technology*, vol. 10, (1996), 40-44.

* cited by examiner

*Primary Examiner* — Joseph Del Sole
*Assistant Examiner* — Ryan Ochylski
(74) *Attorney, Agent, or Firm* — Schwegman Lundberg & Woessner, P.A.

(57) ABSTRACT

A method of molding a micro-fibrous filter including the steps of: (a) forming an aqueous slurry of micro-fibers; (b) introducing the slurry under pressure into the top of an annular molding space so that a mass of fibers becomes compacted on a vertical cylindrical screen and liquid is discharged from the molding space through the screen; (c) increasing the effective open area of the screen by moving upwardly a sleeve in sliding contact with the screen at a rate substantially equal to the rate at which the height of the mass of fibers increases above the support; then (d) removing, drying, and curing the resulting tubular mass of fibers. Acrylate binder resin compatible with the e.g. acidic conditions needed to stabilize the resin, can form part of the fiber slurry used for molding the filter, and after filter formation and drainage can be cured by heat to form the filter.

5 Claims, No Drawings

MOLDED FILTER

RELATED APPLICATIONS

This application is a nationalization under 35 U.S.C. 371 of PCT/GB2007/050043, filed Jan. 30, 2007 and published as WO 2007/088398 A1 on Aug. 9, 2007, which claimed priority under 35 U.S.C. 119 to United Kingdom Patent Application Serial No. 0601888.1, filed Jan. 31, 2006; which applications and publication are incorporated herein by reference and made a part hereof.

FIELD OF THE INVENTION

This invention relates to a molded micro-fibrous filter, to an aqueous fiber slurry for making said filter, and to a process for making said filter using said slurry.

BACKGROUND TO THE INVENTION

U.S. Pat. No. 4,303,472 (the disclosure of which is incorporated herein by reference) describes and claims a method for forming a tubular filter element which includes the steps of:

(a) forming a slurry of fibers in a liquid;
(b) introducing the slurry under pressure into the top of an annular molding space defined between a central core, a vertical cylindrical screen spaced from and outward of said core and a support defining a lower boundary for the molding space so that a mass of fibers becomes compacted on the screen and liquid is discharged from the molding space through the screen;
(c) progressively increasing the height of the effective open area of the cylindrical screen by moving upwardly a sleeve in sliding contact with the cylindrical screen at a rate substantially equal to the rate at which the height of the mass of fibers increases above the support; and
(d) removing the resulting tubular mass of fibers from the molding space.

In a practical embodiment, the filter element comprises a mass of borosilicate glass microfibres bounded by a foraminous outer support sheet or by foraminous inner and outer support sheets, e.g. of steel mesh with an open area of 45-70%. The borosilicate fibers are dispersed in water in a blending tank under mechanical agitation, and an acid, e.g. hydrochloric or sulfuric acid is added to give a pH of 2.9-3.1 at which the dispersion is stable, the fiber to water ratio being 0.01-0.5 wt %, typically 0.05 wt %. The resulting slurry is introduced into the molding space under a pressure of typically 290-480 Pa (6-10 p.s.i) and molded as described above. The sleeve is raised progressively at substantially the same rate as that at which the height of the fiber mass increases in order to maintain a flow of the dispersion to the point where the mass of fibers is building up, after which air may be passed through the molded element to reduce the content of residual water. The formed filter element is removed from the molding space, oven dried, resin impregnated and heated to harden the resin. As originally disclosed, the resin could be e.g. a silicone or an epoxy resin and could be impregnated in a solvent such as acetone, but it is now preferred that the resin should be a phenolic resin which may be impregnated as an aqueous solution. The fibers in a finished filter element produced by the above method are predominantly layered in planes perpendicular to the direction in which the dispersion flows into the molding space, and the same packing pattern arises throughout the range of forming pressures that can be used in practice. This non-random packing pattern results in a filter element that provides efficient depth filtration and has an advantageous combination of properties including high burst strength and low pressure drop. The molded tubular elements may be bonded to end caps to complete the formation of the filter.

The above process has been used e.g. to manufacture air/oil separators designed to remove water and oil mist particles generated in screw or sliding vane compressors or in vacuum pumps where the size of the particles generated lies in the range 0.3-1.5 microns (μm) and also to manufacture in-line filters for removing oil, water and contaminants from a stream of compressed air. Filters for the above purposes are described in our U.S. Pat. No. 5,129,923 the disclosure of which is also incorporated herein by reference.

Our EP-A-1385598 (the disclosure of which is incorporated herein by reference) discloses that improved consistency in molding fibrous filter elements from slurry can be achieved by providing a slurry holding tank or tanks separate from a slurry mixing tank or tanks, recycling aqueous liquid from the or each molding rigs to a reservoir also fed with mains water, and controlling the total volume of water in the apparatus so that mains water need be added to the reservoir only in relatively small increments compared to the volume of aqueous liquid already in the reservoir which then contains predominantly recycled aqueous liquid of known composition or contains liquid of gradually changing composition. By having liquid in the reservoir tank whose composition is largely known or gradually changing, abrupt changes in composition of the liquid in the mixing tank or tanks is avoided and instability and over-shoot in systems for controlling the composition of liquid in the mixing tank or tanks can be avoided Furthermore mixing can be continued until it has been determined that a freshly made slurry mix is of the correct consistency and free of fiber aggregates before the slurry is allowed to enter the holding tank or tanks and to be supplied to the molding rig or rigs.

SUMMARY OF THE INVENTION

In one aspect, the invention provides a moulded micro-fibrous filter in which micro-fibres are held together by a binder, wherein the binder is a cured acrylate resin, said resin being thermally curable. The binder may be incorporated into a slurry from which the fibres are moulded or the filter may be moulded in a preliminary operation, dried and then dipped into a solution of the resin, again dried and cured.

In a further aspect the invention provides an aqueous fibre slurry for use in moulding filter media, wherein said slurry comprises additionally a binder resin in an amount effective, after moulding said filter and curing, to act as binder for the media. The acrylate binder resin should be compatible with the e.g. acidic conditions needed to stabilize the resin, forms part of the fiber slurry used for molding the filter, and after filter formation and removal of surplus aqueous liquid can be cured by heat to complete formation of the molded filter element.

In a yet further aspect, the invention provides a method of moulding a filter, which comprises the steps of:

forming a cylindrical article from an aqueous dispersion comprising glass micro-fibers and an acrylate binder resin; and heating the article to successively drive off water and cure the resin.

In another aspect, the invention provides a method of moulding a filter, which comprises the steps of:

(a) forming a slurry of fibers as aforesaid;

(b) introducing the slurry under pressure into the top of an annular molding space defined between a central core, a vertical cylindrical screen spaced from and outward of said core and a support defining a lower boundary for the molding space so that a mass of fibers becomes compacted on the screen and liquid is discharged from the molding space through the screen;

(c) progressively increasing the height of the effective open area of the cylindrical screen by moving upwardly a sleeve in sliding contact with the cylindrical screen at a rate substantially equal to the rate at which the height of the mass of fibers increases above the support;

(d) removing the resulting tubular mass of fibers from the molding space; and (e) drying the tubular mass and curing binder resin to form said filter.

The filters of the invention may be employed for a wide range of applications including gas filtration e.g. for oil mist coalescence, building air-conditioning and filtration of air for clean rooms.

DETAILED DESCRIPTION OF PREFERRED EMBODIMENTS

Fibers

The invention is concerned with the manufacture of filter media from inorganic fibers that form aqueous dispersions of heat-resistant inorganic fibers e.g. glass microfibres and especially borosilicate glass microfibres.

Stability of fiber dispersions in aqueous dispersion media can be pH dependent. Accurate control of the pH of the dispersion is desirable e.g. in the case of borosilicate fiber dispersions which are unstable and flocculate outside a narrow pH range and are also susceptible to damage by acid. For borosilicate microfibres we have found that the pH is desirably maintained at a pH of 2.9±0.1, otherwise the fibers form clumps which make molding more difficult and reduce the performance of the resulting filter. The pH required for stable microfibre dispersion controls the timing of resin treatment resin addition since phenolic resins, for example, polymerize in acid and cannot be added to the dispersion. A molded filter can only be treated with phenolic resin after the molding operation has taken place.

Resins

The resins used in this invention can be used for post-treatment of a molded filter in the same way as for phenolic resins and impart similar properties but improved appearance to the filter. However, we have found that water-soluble thermosetting acrylic acid-based resin binders can be incorporated into aqueous dispersions of heat resistant inorganic fibers e.g. borosilicate glass micro-fibers and the dispersions can be used to mould filter elements, after which the molded filter elements can be dried and beat-cured. Unlike the phenol-formaldehyde binders used in the prior art, the present resins provide acid-tolerant binders that can be incorporated into the filter as-molded without post-molding drying and impregnation steps, and can be cured following the molding process to give a filter having similar physical properties and performance e.g. in oil coalescing to a phenol-formaldehyde bound filter but of improved color. The invention therefore permits the production of filters at reduced cost but with greater perceived value.

Resins that can be used in the present method include phenol-free binders which are thermosetting acrylic acid-based resin binders which cure by crosslinking with a polyfunctional alcohol or other polyfunctional carboxyl-group reactive curing agent.

U.S. Pat. No. 6,071,994 (Hummerich, assigned to BASF) (the disclosure of which is incorporated herein by reference) discloses formaldehyde-free aqueous binders compositions which can be used as binders in the filter and method of this invention comprising (a) a free-radically polymerized polymer containing from 5 to 100% by weight of units derived from an ethylenically unsaturated acid anhydride or from an ethylenically unsaturated dicarboxylic acid whose carboxyl groups can form an anhydride group, and (b) an alkanolamine having at least two hydroxyl groups, wherein the aqueous binder comprises less than 0.5% by weight, based on the sum of (e) and (b), of a phosphorus-containing reaction accelerant.

Preferred monomers (a) are maleic acid or maleic anhydride, itaconic acid, 1,2,3,6-tetrahydrophthalic acid, 1,2,3,6-tetrahydrophthalic anhydride, their alkali metal and ammonium salts or mixtures thereof. Maleic acid and maleic anhydride are particularly preferred. As well as monomer (a), the polymer may additionally contain monomer (b).

Suitable monomers (b) are for example:

(i) monoethylenically unsaturated $C_3$-$C_{10}$-monocarboxylic acids, (monomer $b_1$), for example acrylic acid, methacrylic acid, ethylacrylic acid, allylacetic acid, crotonic acid, vinylacetic acid, maleic monoesters such as methyl hydrogen maleate, their mixtures and their alkali metal and ammonium salts.

(ii) Linear 1-olefins, branched-chain 1-olefins or cyclic olefins (monomer $b_2$), for example ethene, propene, butene, isobutene, pentene, cyclopentene, hexene, cyclohexene, octene, 2,4,4-trimethyl-1-pentene with or without 2,4,4-trimethyl-2-penten, $C_8$-$C_{10}$-olefin, 1-dodecene, $C_{12}$-$C_{14}$-olefin, octadecene, 1-eicosene ($C_{20-}$), $C_{20}$-$C_{24}$-olefin; metalloeene-catalytically prepared oligoolefins having a terminal double bond, for example oligopropene, oligohexene and oligooctadecene; cationically polymerized olefins having a high CN-olefin content, for example polyisobutene.

(iii) Vinyl and allyl alkyl ethers having from 1 to 40 carbon atoms in the alkyl radical, which alkyl radical can carry further substituents such as hydroxyl, amino or dialkylamino or one or more alkoxylate groups (monomer $b_3$), for example methyl vinyl ether, ethyl vinyl ether, propyl vinyl ether, isobutyl vinyl ether, 2-ethylhexyl vinyl ether, vinyl cyclohexyl ether, vinyl-4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether and also the corresponding allyl ethers and mixtures thereof (iv) Acrylamides and alkyl-substituted acrylamides (monomer $b_4$), for example acrylamide, methacrylamide, N-tert-butyliacrylamide, N-methyl(meth)acrylamide.

(v) Sulfo-containing monomers (monomer $b_5$), for example allylsulfonic acid, methallylsulfonic acid, styrenesulfonate, vinylsulfonic acid, allyloxybenzenesulfonic acid, 2-acrylamido-2-methylpropanesulfonic acid and their corresponding alkali metal or ammonium salts or mixtures thereof.

(vi) $C_1$-$C_8$-Alkyl or $C_1$-$C_4$-hydroxyalkyl esters of acrylic acid, methacrylic acid or maleic acid, or acrylic, methacrylic or maleic esters of $C_1$-$C_{18}$-alcohols alkoxylated with from 2 to 50 mol of ethylene oxide, propylene oxide, butylene oxide or mixtures thereof (monomer $b_6$), for example methyl (meth)acrylate, ethyl(meth)acrylate, propyl(meth)acrylate, isopropyl (meth)acrylate, butyl(meth)acrylate, hexyl(meth)acrylate, 2-ethylhexyl (meth)acrylate, hydroxyethyl(meth)acrylate, hydroxypropyl(meth)acrylate, 1,4-butanediol monoacrylate, dibutyl maleate, ethyldiglycol acrylate, methylpolyglycol acrylate (11 EO), (meth)acrylic esters of $C_{13}$-$C_{15}$-oxo alcohol reacted with 3, 5, 7, 10 or 30 mol of ethylene oxide, or mixtures thereof.

(vii) Alkylaminoalkyl(meth)acrylates or alkylaminoalkyl (meth)acrylamides or quaternization products thereof (monomer $b_7$), for example 2-(N,N-dimethylamino)ethyl (meth)acrylate, 3-(N,N-dimethylamino)propyl (meth)acrylate, 2-(N,N,N-trimethylammonio)ethyl(meth)acrylate chloride, 2-dimethylaminoethyl(meth)acrylamide, 3-dimethylaminopropyl(meth)acrylamide, 3-trimethylammoniopropyl(meth)acrylamide chloride.

(viii) Vinyl and allyl esters of $C_1$-$C_{30}$-monocarboxylic acids (monomer N), for example vinyl formate, vinyl acetate, vinyl propionate, vinyl butyrate, vinyl valerate, vinyl 2-ethylhexanoate, vinyl nonoate, vinyl decanoate, vinyl pivalate, vinyl palmitate, vinyl stearate, vinyl laurate.

(ix) Examples of further monomers $b_9$ are: N-vinylformamide, N-vinyl-N-methylformamide, styrene, α-methylstyrene, 3-methylstyrene, butadiene, N-vinylpyrrolidone, N-vinylimidazole, 1-vinyl-2-methylimidazole, 1-vinyl-2-methylimidazoline, N-vinylcaprolactam, acrylonitrile, methacrylonitrile, allyl alcohol, 2-vinylpyridine, 4-vinylpyridine, diallyldimethylammonium chloride, vinylidene chloride, vinyl chloride, acrolein, methacrolein and vinylcarbazole and mixtures thereof.

As well as monomer (a), the polymer can additionally contain from 0 to 95% by weight of monomer (b). Preferably, as well as monomer (a), the polymer additionally contains monomer (b) in amounts from 50 to 95, particularly preferably from 60 to 90,% by weight. Preferred monomers are acrylic acid, methacrylic acid, ethene, propene, butene, isobutene, cyclopentene, methyl vinyl ether, ethyl vinyl ether, acrylamide, 2-acrylamido-2-methylpropanesulfonic acid, vinyl acetate, styrene, butadiene, acrylonitrile and mixtures thereof. Particular preference is given to acrylic acid, methacrylic acid, ethene, acrylamide, styrene and acrylonitrile and mixtures thereof. Depending on the choice of polymerization conditions, it is possible to obtain weight average molecular weights for example within the range from 800 to 5,000,000, especially from 1,000 to 1,000,000. The weight average molecular weights $M_w$ are preferably above 15,000. Weight average molecular weights from 15,000 to 600,000 are particular preferred. $M_w$ may be determined by gel permeation chromatography. The Examples disclose various solutions of e.g. acrylic acid/maleic acid copolymer mixed in aqueous solution with triethanolamine and having pH values in the range 2.4-3.5 so that these solutions are good candidates for use in aqueous glass fiber dispersions e.g. borosilicate glass fiber dispersions where the pH of the dispersion is close to that which is preferred for maintaining the glass fibers in suspension.

One preferred resin that may be used in the method of the invention is Acrodur DS 3530 (BASF) which is an aqueous solution of a modified polycarboxylic acid and a polyhydric alcohol as crosslinking component and as supplied has a solids content of 50 wt %, a pH of 2.5-4, a molecular weight of about 12,000 and a Brookfield viscosity at 23° C. of 150-300 mPa·s. A further more preferred resin is Acrodur 950 L (BASF) which is similar, but has a pH of 3.5, a molecular weight of about 80,000 and a Brookfield viscosity at 23° C. of 600-4000 mPa·s. It has been stated to crosslink at temperatures as low as 180° C., with a recommended temperature of 200° C. and is an aqueous solution of a substituted polycarboxylic acid. It contains a polybasic alcohol as the crosslinking agent. The polycarboxylic acid is a carboxylated acrylic polymer and the polybasic alcohol is triethanolamine. The preparation is presented as a 50% solids solution in water with viscosity of 1000-4500 cps, specific gravity of 1.2. It may be used in the dispersion at e.g. a concentration of about 40-80 g/liter depending on the desired mechanical properties of the filter, the effect of resin concentration in the dispersion on pressure drop of the resulting filter medium being relatively small. Waste aqueous liquid from the molding process may be recycled to the dispersion-forming tank giving economy of resin use. Cure temperatures of Acrodur resins are typically 130° C. and 200° C.

A further group of resins that may be used in the filter and method of this invention is described in U.S. Pat. No. 5,318,990 (Strauss et al., Owens-Corning), the disclosure of which is incorporated herein by reference, which are based on an aqueous solution of a polycarboxy polymer, a monomeric trihydric alcohol and a catalyst. The resins are disclosed as binders for glass fibers that have a low viscosity when uncured and structural rigidity when cured.

The polycarboxy polymer may be (a) an organic polymer or oligomer containing more than one pendant carboxy group, e.g. a homopolymer or copolymer prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like, or (b) unsaturated anhydrides including, but not necessarily limited to, maleic anhydride, itaconic anhydride, acrylic anhydride, methacrylic anhydride, and the like, as well as mixtures thereof. Methods for polymerizing these acids and anhydrides are well-known in the chemical art. The polycarboxy polymer may additionally comprise a copolymer of one or more of the aforementioned unsaturated carboxylic acids or anhydrides and one or more vinyl compounds including, but not necessarily limited to, styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, vinyl acetate, and the like. Methods for preparing these copolymers are well-known in the art. Preferred polycarboxy polymers comprise homopolymers and copolymers of polyacrylic acid.

Contemplated trihydric alcohols include, but are not necessarily limited to, glycerol trimethylolpropane, trimethylolethane, triethanolamine, 1,2,4-butanetriol, and the like, as well as mixtures thereof. In practice, the monomeric trihydric alcohols may be mixed with other polyhydric alcohols for use in the binder composition. Such other polyhydric alcohols include, but are not necessarily limited to, ethylene glycol, 1,3-propanediol, 1,4-butanediol, 1,6-hexanediol, 2-butene-1, erythritol, pentaerythritol, sorbitol, and the like, as well as mixtures thereof. Preferred monomeric trihydric alcohols comprise glycerol and trimethylolpropane, as well as mixtures thereof.

The catalyst may be an alkali metal salt of a phosphorous-containing organic acid; particularly alkali metal salts of phosphorous acid, hypophosphorous acid, and polyphosphoric acids. Examples of such catalysts include, but are not necessarily limited to, sodium hypophosphite, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, and sodium tetrametaphosphate, as well as mixtures thereof. Preferred catalysts include sodium hypophosphite and sodium phosphite, as well as mixtures thereof.

Specific materials include polyacrylic acid (MW 60,000), polyacrylic acid (MW 2100), glycerol or trimethylolpropane and sodium hydrosulphite. These materials are disclosed as being applied to glass fibers and being curable in a flow of heated air at 275° C.

U.S. Pat. No. 5,932,689 (Arkens et al., Rohm & Haas) (the disclosure of which is incorporated herein by reference) discloses formaldehyde-free compositions which can be used as binders in the filter and method of this invention, but which do not essentially require the presence of an accelerator and can be crosslinked at relatively low temperatures. Such compositions comprise (a) a polyacid comprising at least two carboxylic acid groups, anhydride groups, or salts of the polyacid thereof; (b) an active hydrogen compound containing at least two active hydrogen groups selected from the group consisting of hydroxyl, primary amino, secondary amino, and mixtures thereof; and (c) one or more compounds selected from the group consisting of cyanamide, dicyandiamide, 1,2-mono or di-($C_1$-$C_6$ alkyl) substituted-3-cyanoguanidines such as ethyl-3-cyanoguanidine, 1,2-diethyl-3-cyanoguanidine, and 1,2-diisopropyl-3-cyanoguanidine, and 1,2-mono- or di-($C_6$-$C_{12}$ aryl) substituted-3-cyanoguanidines, such as phenyl-dicyandiamide. Other references that disclose suitable formaldehyde-free binder resins and whose disclosures are incorporated herein by reference include U.S. Pat. Nos. 5,977,232 (Arkens), 6,136,916 (Arkens), 6,274,661 (Chen, assigned to Owens Corning Fiberglass), 6,331,350 (Taylor, Johns Manville), 6,699,945 (Chen, Owens Corning)

Further disclosures of suitable resins are in U.S. Pat. No. 6,146,746 (Reck, assigned to BASF) and in U.S. Pat. No. 6,099,773 and U.S. Pat. No. 6,299,936, the disclosure of which is also incorporated herein by reference.

U.S. Pat. No. 6,221,973 (Arkens) (the disclosure of which is incorporated herein by reference) discloses compositions which can be used as binders in the filter and method of this invention based on (a) a polyacid containing at least two carboxylic acid groups, anhydride groups or salts thereof, and (b) a polyol containing at least two hydroxyl groups which in one embodiment contain a highly reactive polyol without a phosphorous-containing accelerator. Polyols sufficiently reactive to permit the omission of a phosphorous-containing accelerator may be used in the composition which contains (a) a polyacid containing at least two carboxylic acid groups, anhydride groups, or the salts thereof and (b) a highly reactive polyol containing at least two hydroxyl groups; wherein the ratio of the number of equivalents of said carboxylic acid groups, anhydride groups, or salts thereof to the number of equivalents of said hydroxyl groups is from about 1/0.01 to about 1/3, and wherein the carboxyl groups, anhydride groups, or salts thereof are neutralized to an extent of less than about 30% with a fixed base. The composition may be used as a binder for nonwovens composed of fiberglass or other heat-resistant fibers. Suitable highly reactive polyols include β-hydroxyalkyl amides e.g. bis[N,N-di(.beta.-hydroxyethyl)]adipamide, bis[N,N-di(.beta.-hydroxypropyl)]azelamide, bis[N—N-di(.beta.-hydroxypropyl)]adipamide, bis[N—N-di(.beta.-hydroxypropyl)]glutaramide, bis[N—N-di(.beta.-hydroxypropyl)]succinamide, and bis[N-methyl-N-(.beta.-hydroxyethyl)]oxamide.

Molding Processes

In an embodiment there is provided a modification of the process disclosed in U.S. Pat. No. 4,303,472 which includes the steps of:

(a) forming a slurry of fibers in an aqueous liquid containing a binder resin of the type described above;

(b) introducing the slurry under pressure into the top of an annular molding space defined between a central core, a vertical cylindrical screen spaced from and outward of said core and a support defining a lower boundary for the molding space so that a mass of fibers becomes compacted on the screen and liquid is discharged from the molding space through the screen;

(c) progressively increasing the height of the effective open area of the cylindrical screen by moving upwardly a sleeve in sliding contact with the cylindrical screen at a rate substantially equal to the rate at which the height of the mass of fibers increases above the support;

(d) removing the resulting tubular mass of fibers from the molding space; and (e) drying the tubular mass and curing binder resin to form said filter. Typical drying temperatures at which curing also occurs are about 180-200° C. or even above.

In some embodiments, accurate control of the pH of the slurry is important e.g. in the case of borosilicate fiber slurries which are unstable and flocculate outside a narrow pH range and are also susceptible to damage by acid. In some embodiments for molding tubular filter elements e.g. of borosilicate microfibres the slurry used for molding should have a pH of 2.9±0.1. Such control may be achieved by providing a pH sensor for immersion in the aqueous slurry and pH control means for monitoring the pH of the aqueous liquid in said mixing tank on the basis of received signals from said pH sensor, the arrangement being such that when said pH is outside a range of target values the control means operates acid or base supply means to add acid or base to the molding tank to adjust of the pH of the aqueous liquid therein. Further control of the consistency of the slurry may be achieved by providing a turbidity sensor for monitoring the consistency and aggregation of the fiber slurry, the microfibres being mixed to a constant turbidity before the resulting slurry is introduced into the molding space. Real-time optical sensing of the consistency of the mix is desirable for an operator to be certain that mixing has been completed and that the mix does not contain fiber aggregates.

Means may be supplied for feeding slurry of microfibres and binder under pressure to the molding space, and may comprise a pump in a conduit leading from a holding tank to said molding space. The or each molding rig may include means defining a molding space between a central core and a cylindrical screen spaced from and outward of said core, and means defining a boundary for the molding space so that a mass of fibers becomes compacted on the screen and liquid is discharged from the molding space through the screen. Advantageously the or each rig further comprises a cylindrical sleeve in sliding contact with the cylindrical screen and drive means for moving the sleeve upwardly from a position substantially covering the screen as molding progresses whereby the height of the effective open area of the cylindrical screen progressively increases during molding. For best properties in the finished filter tube, the drive means may be arranged to move the screen upwardly at a rate substantially equal to the rate at which the height of the mass of fibers increases above the support.

The fibers that can be molded according to the invention are not limited to borosilicate glass microfibers, and could include polyester fibers, polyamide fibers, or other synthetic fibers or mixtures of borosilicate or other glass fibers with synthetic fibers. Molding of other shapes than cylindrical elements is possible, for example planar filter elements, frustoconical filter elements or filter elements of arbitrary shape, subject to the availability of appropriate tooling.

The invention is illustrated by the following Examples.

Example 1

A molded filter tube is produced using the process disclosed in U.S. Pat. No. 4,303,472 but with borosilicate glass fibers dispersed at in water adjusted to pH 2.9-3.1 with added sulfuric acid and containing about 80 g/l Arcodur 950L. The fiber suspension in the acid/resin had similar molding characteristics to fiber/acid dispersion and is moldable on an existing rig. The molded filter tube is then heated at 200° C. for 90 minutes to drive off water and cure the resin. The resulting filter tube is formed into a finished coalescing filter which is evaluated against a similar filter tube molded a under similar conditions using phenolic/post treatment which provided a control. The oil-wetted pressure drop and the cold start pressure drop of the acrylate-molded filter are less than the control using the phenolic resin and the oil carryover of the acrylate-molded filter when challenged with an oil aerosol is comparable to but slightly above the control filter using phenolic resin.

The Acrodur resin gives a satisfactory product that met required pressure drop and oil carryover specifications. However improved results may be obtainable using 160 g/l of resin.

Example 2

Molded and dried borosilicate glass filter tubes were weighed, impregnated with Acrodur 950L and Acrodur DS 3530 by immersion and then reweighed. The tubes were then dried at 100° C. for 8 hours, cured at 180° C. for 1 hour, made up into oil-coalescing filters and tested for pressure drop and coalescence efficiency in a Busch vacuum pump. The results are as in the attached table.

|  | Dry Wt | Wet Wt | Theoretical Dry Wt | Sanded Wt | Filter pressure drop (millibars) | Efficiency (µg/l per 50 µg/l upstream challenge) |
|---|---|---|---|---|---|---|
| | | | 950L | | | |
| 20 g/l | 115 | 480 | 122 | 119 | 33.5 | 0.0028 |
| 40 g/l | 116 | 497 | 131 | 123 | 34.5 | 0.0002 |
| 80 g/l | 115 | 502 | 146 | 128 | 35 | 0.0028 |
| | | | DS3530 | | | |
| 20 g/l | 116 | 483 | 123 | 120 | 32.8 | 0.0005 |
| 40 g/l | 115 | 485 | 130 | 122 | 33.3 | 0.0008 |
| 80 g/l | 114 | 482 | 143 | 127 | 34.5 | 0.0028 |

The invention claimed is:

1. A method of moulding a filter, comprising:
    forming an aqueous dispersion comprising fibers, wherein said fibers consist of glass micro-fibers, said dispersion further comprising a thermally curable water-soluble acid-based resin binder comprising a carboxylated acrylic polymer and a polyfunctional alcohol, the dispersion having a pH of about 3;
    forming a tubular article from the aqueous dispersion by feeding said dispersion to a tubular molding space; and
    heating the article to successively drive off water and cure the resin.

2. The method of claim 1, which comprises feeding the aqueous dispersion under pressure to the molding space.

3. The method of claim 2, wherein forming a tubular article comprises:
    introducing the dispersion under pressure into the top of an annular molding space defined between a central core, a vertical cylindrical screen spaced from and outward of said core and a support defining a lower boundary for the molding space so that a mass of fibers becomes compacted on the screen and liquid is discharged from the molding space through the screen;
    progressively increasing the height of the effective open area of the cylindrical screen by moving upwardly a sleeve in sliding contact with the cylindrical screen at a rate substantially equal to the rate at which the height of the mass of fibers increases above the support; and
    removing the resulting tubular mass of fibers from the molding space.

4. The method of claim 3, wherein forming comprises forming the dispersion using borosilicate glass microfibers.

5. The method of claim 4, wherein forming comprises forming the dispersion using a heat-curable aqueous binder comprising a polymer containing from 5 to 100% by weight of units derived from an ethylenically unsaturated acid anhydride or from an ethylenically unsaturated dicarboxylic acid whose carboxyl groups can form an anhydride group, and a monomeric trihydric alcohol or an alkanolamine having at least two hydroxyl groups.

\* \* \* \* \*